June 2, 1942.  F. A. MIRANDO ET AL  2,284,833
METHOD AND APPARATUS FOR MAKING KNIFE
HANDLES AND COMPONENT PARTS THEREOF
Original Filed July 6, 1938  5 Sheets-Sheet 1

INVENTORS
FELIX A. MIRANDO
HENRY VOSSLER
BY
ATTORNEY

June 2, 1942.    F. A. MIRANDO ET AL    2,284,833
METHOD AND APPARATUS FOR MAKING KNIFE
HANDLES AND COMPONENT PARTS THEREOF
Original Filed July 6, 1938    5 Sheets-Sheet 4

INVENTORS
FELIX A. MIRANDO
HENRY VOSSLER
BY
ATTORNEY

June 2, 1942.   F. A. MIRANDO ET AL   2,284,833
METHOD AND APPARATUS FOR MAKING KNIFE
HANDLES AND COMPONENT PARTS THEREOF
Original Filed July 6, 1938   5 Sheets-Sheet 5

INVENTORS
FELIX A. MIRANDO
HENRY VOSSLER
BY
ATTORNEY

Patented June 2, 1942

2,284,833

UNITED STATES PATENT OFFICE 2,284,833

METHOD AND APPARATUS FOR MAKING KNIFE HANDLES AND COMPONENT PARTS THEREOF

Felix A. Mirando and Henry Vossler, Providence, R. I., assignors to Imperial Knife Company, Inc., Providence, R. I., a corporation of Rhode Island Original application July 6, 1938, Serial No. 217,826. Divided and this application July 22, 1939, Serial No. 285,862

17 Claims. (Cl. 18—19)

Our invention relates to knife handles. More particularly, our invention relates to a novel method and apparatus for making knife handles having ornamental scale covering members.

One of the objects of our invention is to provide in an apparatus for making knife handles of the character described novel means for mounting the ornamental scale covering member on the handle.

Another object of our invention is to provide a novel method of assembling an ornamental scale covering member and a scale to form a knife handle, whereby the said scale covering and scale are relatively captively held.

Still another object of our invention is to provide a method of assembling an ornamental scale covering member and a scale in which the assembly is effected by a novel manner of deforming the scale covering member.

A still further object of our invention is to provide a novel and highly efficient method and apparatus of the character described which shall be simple in operation and economical in manufacture, and which at the same time shall present a general improvement in the art.

Other objects of our invention will in part be obvious and in part hereinafter pointed out.

Certain features shown and described but not claimed in this application are shown, described and claimed in our copending application, Serial No. 217,826, filed July 6, 1938, for Knife handles and component parts thereof, of which the present application is a division.

The invention accordingly consists in the features of construction, combinations of elements, and arrangement of parts and steps which will be exemplified in the construction hereinafter described, and of which the scope of application will be indicated in the claims.

In the accompanying drawings, in which is shown one of the various possible embodiments of this invention.

Figures 1, 3, 6:
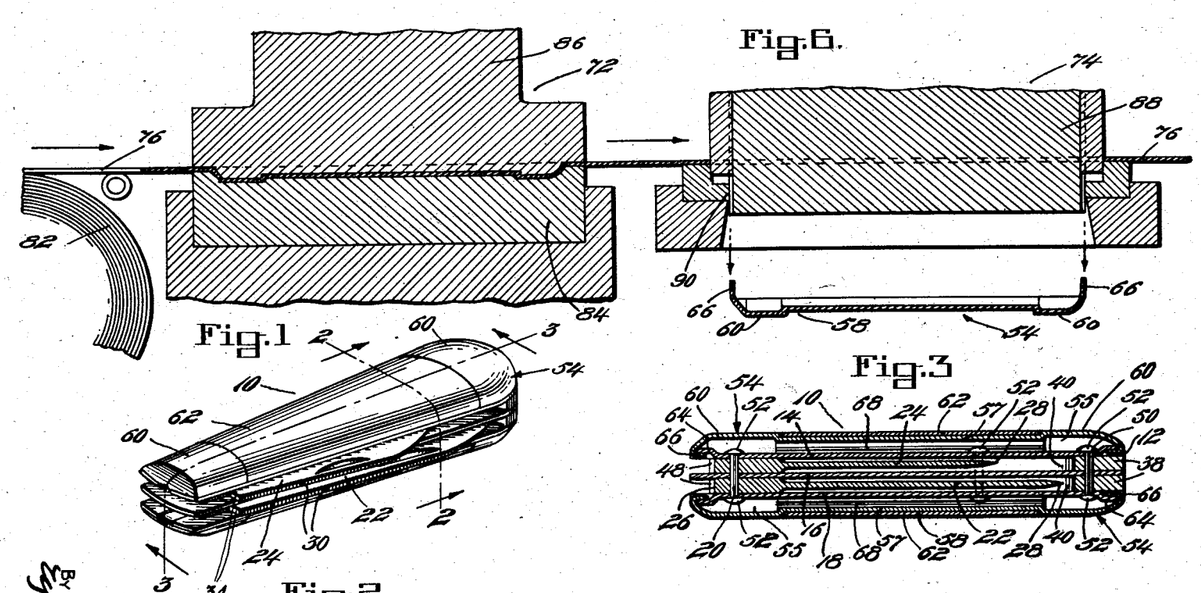
Fig. 1 is a perspective view of a jack knife constructed in accordance with our invention.
Fig. 3 is a longitudinal sectional view taken therethrough along the line 3—3 of Fig. 1.
Fig. 6 is a diagrammatic vertical sectional view through a suitable apparatus illustrating the steps of forming and punching out the scale from a sheet of material.
Figures 2, 4:
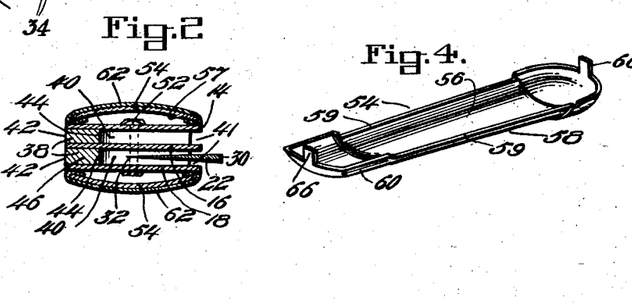
Fig. 2 is a cross sectional view therethrough taken along the line 2—2 of Fig. 1.
Fig. 4 is a perspective view of the scale before assembly.

In Figs. 1, 2 and 3 of the drawings there is shown a jack knife 10 having a handle comprising a scale 54 and an ornamental scale covering member 62 assembled in accordance with our invention.

Although a jack knife 10 of specific construction has been used for the purpose of illustrating our invention, it is to be understood that we are not limited to this form of construction, but may employ a knife handle fabricated by means of our novel method and apparatus with any other type of knife known in the art.

The knife 10 may consist of any suitable standard type of knife handle frame such as, for example, the frame 12, comprising spaced top, bottom and intermediate lining sheets 14, 16 and 18 respectively having a pivot rivet 20 joining said lining sheets together at one end thereof and the large and small knife blades 22 and 24 each having a mounting end pivotally mounted on said pivot rivet 20, said mounting end being arcuately curved as at 26. Each blade contains an opposite pointed end 28, an outer blunt edge 30 and an inner sharp edge 32. The outer blunt edge 30 is inset as at 34 from a point interior of said pivot rivet to said curved mounting end 26 to provide at this point a stop shoulder 34.

The standard type of knife handle frame also includes the block spacing members 38, one for each blade interposed between said lining sheets 14, 16 and 18, each having a cut out portion at one side thereof extending concavely inwardly as at 40 at one end thereof to receive the pointed end 28 of its respective blade, and then substantially parallel to the opposite side wall 42 thereof as at 44 to provide a compartment 41 for holding the sharp edge 32 of the knife blade in closed position and to provide a resilient leaf 46 to yieldingly resiliently abut the curved mounting end 26 of each blade and terminating near the mounting pivot end of said lining member as at 48 to abut said blade stop shoulder 34 near the curved mounting end of said blade to retain said blade in open position in line with said handle frame 12. Supplemental rivets 50 are also provided extending through said lining sheets 14, 16 and 18 and block spacing members 38 to join said sheets and members together to provide a knife handle frame. In the prior art both the joining rivets 50 and the pivot rivet 20 have had to be of relatively small size so that the heads 52 thereof could be ground down to be flush with the top and bottom surfaces of said respective lining members 14 and 18, to receive the inner flat surfaces of the flat scales and tips or bolsters formerly employed evenly thereon.

However, by employing the knife handle made in accordance with our invention, as shown more particularly in Figs. 2 and 3, we may use larger size pivot and other rivets 20 and 50 which may be provided with large upset heads projecting outwardly from the outer surfaces of the top and bottom lining sheets 14 and 18 respectively.

We provide combination scale and bolster or tip forming members 54 for covering the top and bottom surfaces of said frame, said members being of the general configuration of the top and bottom walls of said frame. While said members may be stamped, molded or otherwise constructed of solid formation, in our preferred embodiment each preferably comprises an elongated inverted oblong cup of the configuration of the top or bottom wall of said frame, each member therefore being provided with an interior cupped portion 56 forming a space 55 between the outer wall 57 of each member and the outer surface of the top and bottom lining sheets 14 and 18 of the knife handle frame 12 to receive therein the enlarged heads 52 of the large respective rivets 20 and 50 hitherto described. It is apparent that our improved combination members may be readily stamped, pressed or otherwise fabricated from sheet material in this cup formation. In our preferred embodiment, each of said members is preferably provided with an inset elongated center portion 58 for holding the scale covering which may be readily stamped, pressed, or otherwise formed in the fabrication of our improved combination members, thereby providing the bolsters or tips 60 at each end of our improved combination member 54 projecting outwards above said inset center portion 58. If the exposed metal surfaces 60 at the ends of said combination members 54 are of considerable length they have been called bolsters in the trade, but if they are of relatively short length they have been called tips in the trade and it is immaterial insofar as our invention is concerned whether said end portions be of such a length as to provide bolsters or tips.

Figure 5:
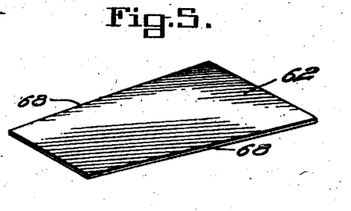
Fig. 5 is a perspective view of the scale covering member before assembly.

We also provide scale coverings 62, each comprising a sheet of covering material, in our preferred embodiment shown, of ornamental plastic material extending over the surface of and secured to the center inset portion 58 of each respective combination member 54.

While our improved combination members 54 are preferably constructed of stamped or pressed metal, it is apparent they may be constructed of plastic or any other suitable material. While any means may be employed for securing our improved combination members 54 to the top and bottom surfaces of the knife handle frame 12, in our preferred embodiment we preferably provide the top and bottom lining sheets 14 and 18 with the raised longitudinal notch forming portions 64 at the center portion of each end thereof, which notch forming portions may be readily stamped in said lining sheets as they are being stamped or otherwise fabricated, and we provide a projection 66 projecting downwardly from each end of each member 54 adapted to be bent to slide into each respective longitudinal frame notch 64 to retain its respective member 54 to said handle frame 12. It is apparent, however, that, if desired, other means may be employed for securing the respective combination members to the top and bottom surfaces of said knife handle frame and for this purpose the ends of the combination members 54 may, if desired, be alternatively soldered or spot welded to the ends of the respective top and bottom surfaces of the handle frame, if desired.

While we preferably employ a plastic material, such as ornamental Celluloid, synthetic resin of the phenol or urea formaldehyde condensation or other type, cellulose acetate, rubber or otherwise as our improved plastic covering sheet 62, it is apparent that the covering sheet may comprise any other suitable plasticizable resilient material.

While we have shown the member 54 as provided with tips or bolsters 60 at each end thereof, it is to be understood that our invention can satisfactorily be applied to scale holding members having only one or no bolsters or tips.

In practicing our invention, we preferably fold the edges 68 of said plastic sheet 62 under the inset edges of said center portion 58 of said scale 54 when in a plastic condition along the respective lines of folding only to retain said plastic sheet 62 over the surface of the inset center portion 58 of said scale in shrunk, drum tight condition when deplasticized without other retaining means. In this manner the scale member 62 may be supported on the scale 54 independent of all other agencies such as for example the knife frame 12 and is thereby wholly self-held to the said scale. While the particular method we employ for this purpose is particularly advantageous in securing a plastic sheet in drum tight condition over the inset center portion of such a member without longitudinal shrinkage, our improved method may be employed for covering the entire surface of such a scale. The plastic sheet 62 is preferably superimposed over the surface of said center inset portion when in a semiplastic condition and the edges 68 thereof readily folded over the inset edges 59 of said center portion 58 and suitable heat provided along the fold lines 70 only by means of applying greater pressure against said fold lines to plasticize the covering along the fold lines only so that it may be shrunk on said device along said fold lines only. We have discovered that if the entire plastic sheet be rendered plastic it will shrink so much on cooling that gaps will be left at each end of the plastic sheet within the respective ends of the inset portion 58. If, however, the plastic sheet be rendered plastic along said fold lines only there will be no appreciable longitudinal shrinkage thereof and only sufficient transverse shrinkage to insure that the sheet will extend in shrunk, drum tight condition over the surface of said inset portion.

Employing our invention we are also enabled to save a large amount of scale covering material formerly thought necessary as we may employ sheets of plastic material even of a thickness of .010–.030 inch.

The scale 54 may be formed in any suitable manner, such as by means of a pressing punch and cutter like those diagrammatically illustrated in Fig. 6, although other types of shaping, forming or cutting devices may be employed. A continuous sheet of sheet metal 76 is drawn from a roll 82 of such sheet metal and fed into a pressing device 72 having cooperating dies 84, 86 shaped to form the inset center portion 58 and tips or bolsters 60 of the scale 54. At the right hand side of Fig. 6 we have illustrated a suitable cutting device for cutting out the members 54 previously shaped in the pressing device 72. The cutter includes a cutting tool 88 and cutting form 90, each of which is so shaped that the members 54 may be cut out of the metal strip 76 with the projections 66 projecting from each end thereof. The sheet 76 may be fed continuously at a slow speed as the punch 74 and cutting tool 88 operate very quickly or said strip 76 may be fed forward at intermittent intervals in synchronization with the operation of the punch and cutter in any suitable manner.

The ornamental scale covering member 62 may be formed in any suitable manner, such as by die cutting from a sheet to form a blank 62 as shown in Fig. 5. This blank 62 is adapted to be used with a scale 54 to form a handle for a jack knife such as illustrated at Figs. 1 to 3. This scale covering member 62 comprises a thin sheet of ornamental plastic covering material of a length substantially equal to the length of the inset center portion 58 of the scale 54 and of a width substantially greater than said portion 58.

Figures 7, 9, 12:
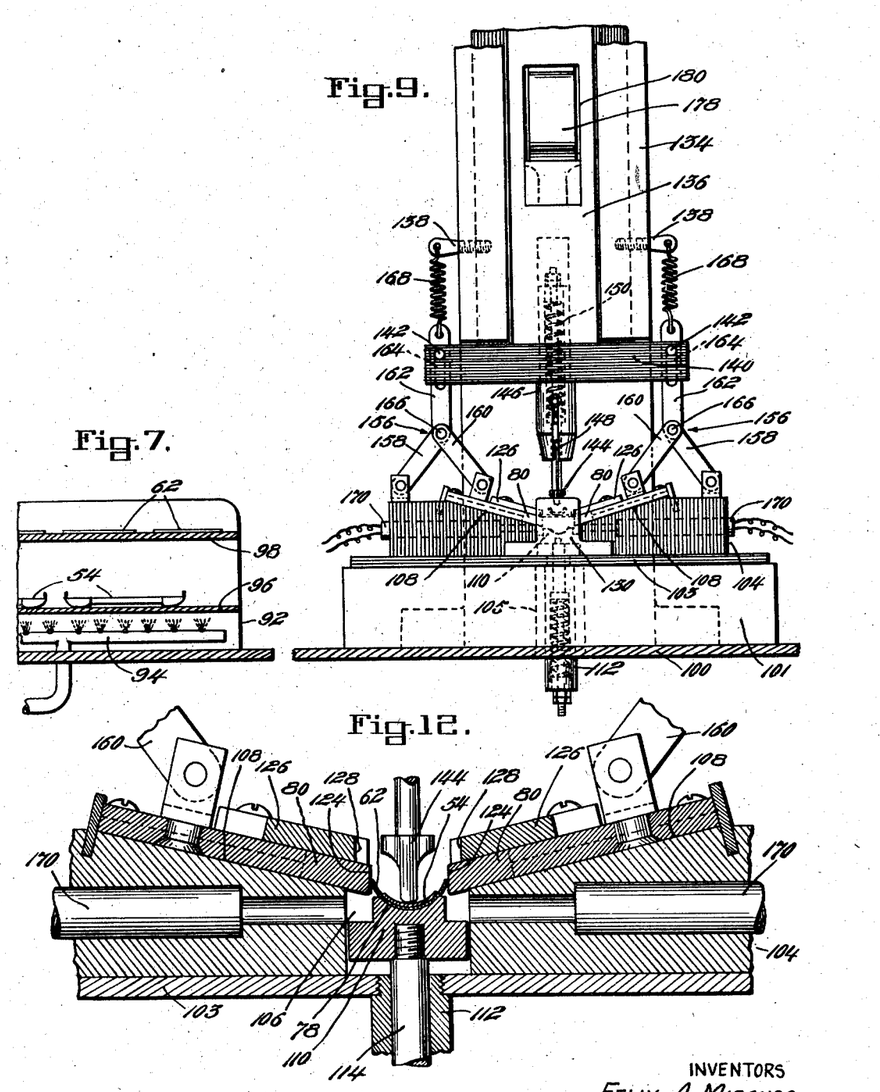
Fig. 7 is a vertical sectional view of a suitable heating oven having a hotter zone for heating the scale and a less hot zone for heating the plastic sheets and adapted in use to be adjacent the press.
Fig. 9 is a front elevational view of the apparatus shown in Fig. 8, but of reduced size.
Fig. 12 is an enlarged sectional view similar to Fig. 11 but showing still another step in the operation thereof.
Figure 8:
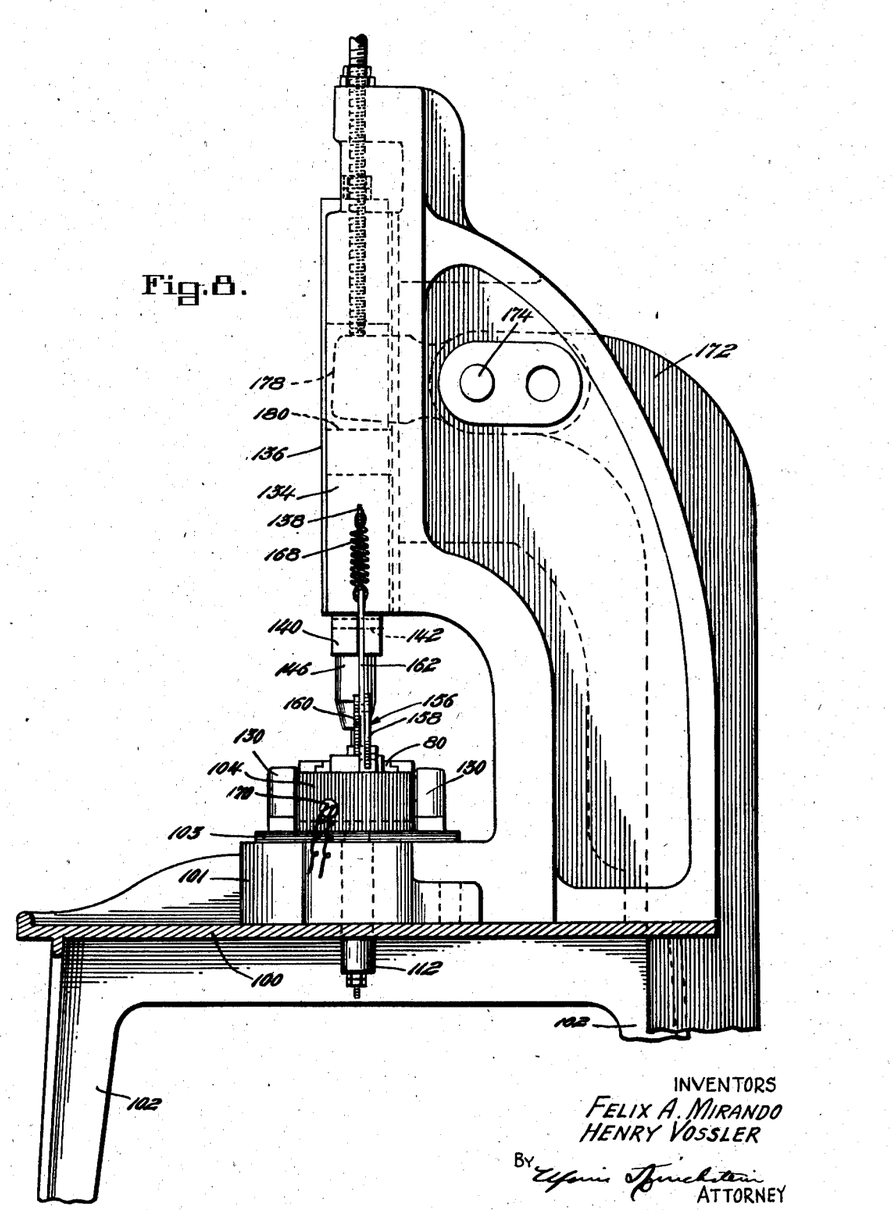
Fig. 8 is a side elevational view of our apparatus for assembling the scale covering and scale shown in Figs. 4 and 5.
Figure 10:
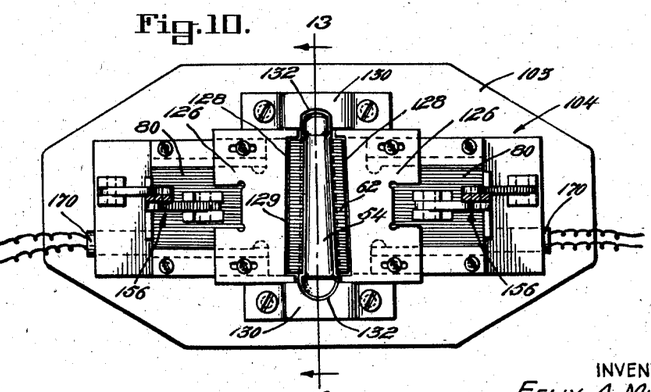
Fig. 10 is a plan view of the die portion of the apparatus shown in Fig. 9, with the plunger and plate actuating means removed.
Figure 11:
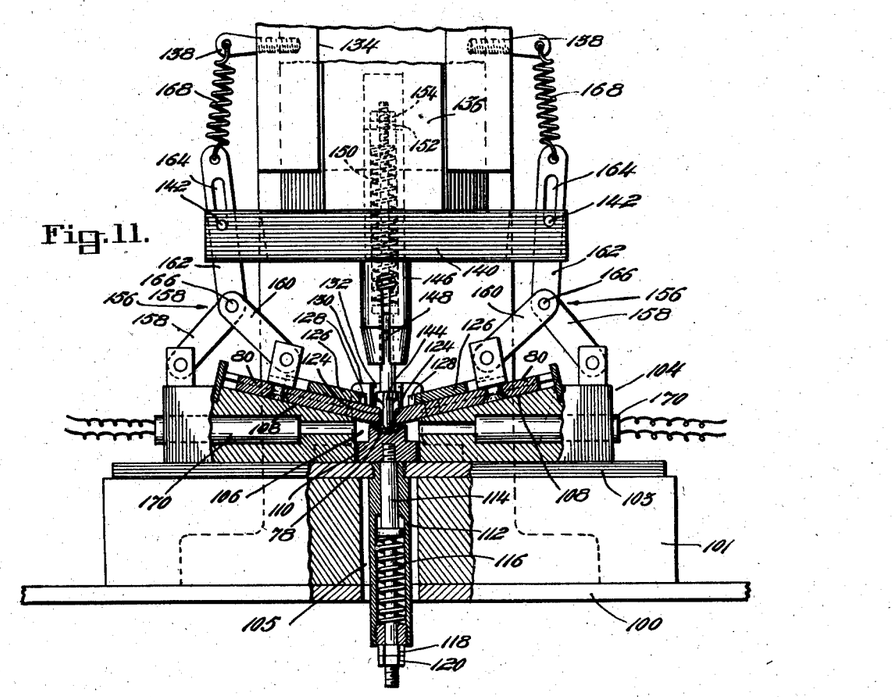
Fig. 11 is an enlarged partly sectional view of the apparatus shown in Fig. 9, illustrating a step in the operation thereof.
Figure 13:
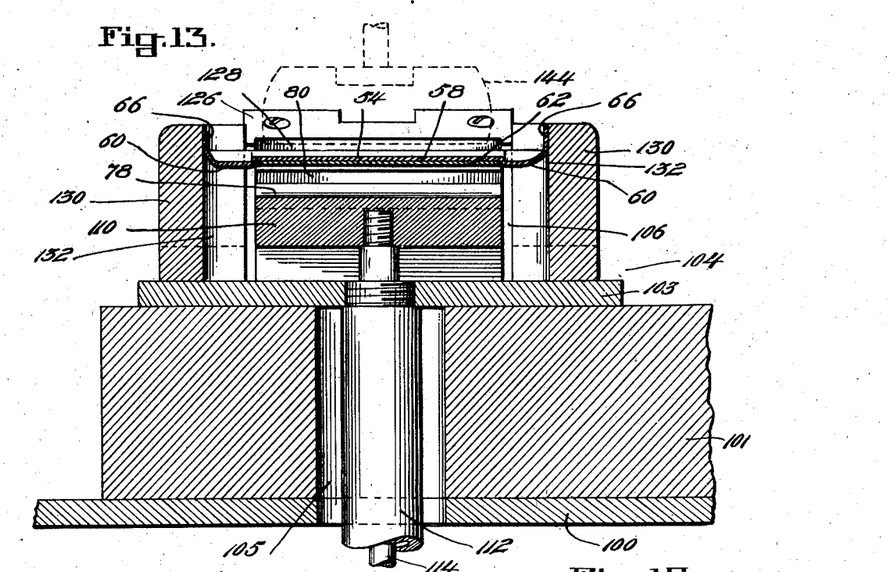
Fig. 13 is a cross sectional view taken along line 13—13 of Fig. 10, Figs. 14, 15 and 16 are sectional views illustrating various steps of assembling a knife handle in accordance with our invention.
Figure 14:
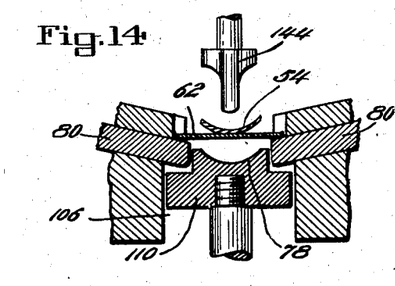
Figure 15:
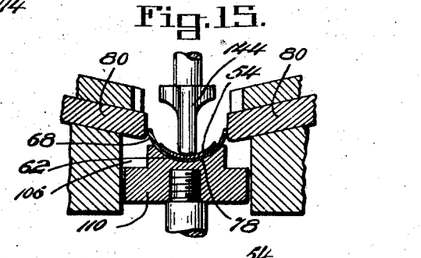
Figure 16:
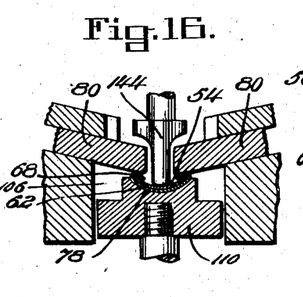
Figure 17:
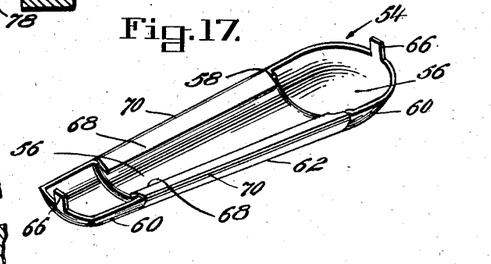
Fig. 17 is a perspective view of a knife handle assembled in accordance with our invention.

In practicing our novel method we suitably heat, as diagrammatically illustrated in Fig. 7, the plastic sheets 62 to a semiplastic condition by subjecting them in the embodiment shown to a temperature of about 100° to 120° F. We heat the scale 54 to a greater degree, which in the embodiment shown is a temperature of from about 200° to 300° F. We then as shown in Fig. 14 relatively superimpose said scale 54 on a sheet 62 and exert sufficient relatively slightly yieldable pressure against said scale and plastic sheet through a forming tool 144 to bend it against a heated surface, such as that of the forming die 78 of substantially equal width and length and substantially similarly transversely arched as the surface of the inset center portion of said scale to similarly shape said plastic sheet in concave formation as shown in Fig. 15, permitting the edges 68 of said sheet to project obliquely upwardly from said yieldingly compressed arched surfaces. We then by suitable means bend the then upturned edges 68 of the covering sheet 62 inwardly over the edges 59 of said scale and apply sufficient pressure against the thus formed fold lines 70 to render them plastic, whereby on cooling said plastic sheet will shrink laterally along said fold lines 70 only to retain said covering over the surface of the inset center portion of said scale in shrunk, drum tight condition without other retaining means and without substantial longitudinal shrinkage of said covering. To bend the upturned edges 68 of said covering material we preferably move the heated members 80 obliquely laterally and downwardly over the edges of said inset center portion of said scale at a lesser distance than the thickness of said plastic sheet to fold the edges of said plastic sheet over the edges of said inset center portion of said scale. This step is illustrated in Fig. 16. We thus apply sufficient pressure between said plastic sheet and the edges 59 of said center portion 58 of said scale to apply sufficient heat to the thus formed fold lines 70 to render them plastic, whereby after removing said thus assembled means from said movable means on the cooling or deplasticizing of said fold lines of said covering, the covering will shrink laterally along said folding lines only to achieve the aforedescribed results. If desired, our invention may also be satisfactorily accomplished by omitting the step of preheating the scale covering 62 and the scale 54 previously described in connection with Fig. 7.

If the entire covering is rendered plastic during the heat treatment, it will tend to shrink longitudinally to have gaps at the ends thereof and laterally so that the edges may unbend. While the edges thereof may be bent without at the same time heating them, they will not retain a set position to shrink the covering over the surface of the scale in drum tight condition.

It is obvious that substantially the same method may be employed if it be desired to wrap the covering over the entire surface of the scale, and that a similar method may be employed employing a flat scale if the edges 68 be first bent upwardly in any suitable manner before being bent inwardly and having applied thereto sufficient pressure to render them plastic during the bending of the edges. As stated, the plastic sheet and scale are only yieldably held together with a slight degree of pressure and tension leaving a certain amount of occluded insulating gases between them, which prevent sufficient rapid conduction of heat to permit the entire surface of the plastic sheet to become plastic. It is only where sufficient pressure is applied against the infolded edges 70 of said plastic sheets to compress them strongly against the edges 59 of the scale 54 that any substantial amount of heat conduction takes place.

While our improved method may be carried out in any suitable manner we have shown in the drawings a suitable type of apparatus for carrying it out, including particularly an assembly apparatus particularly designed by us for this purpose and including a press having novel combination features.

In carrying out our improved method the scale forming members 54 are preferably heated to a relatively high temperature in the relatively hot zone of a suitable heater 92, shown in Fig. 7, and the plastic sheets 62 are suitably heated to a lesser temperature in a less hot zone of said heater 92, heat being suitably supplied to heater 92 by the gas burner 94 or any type of gas, electric, or other heating means which first heats the plate 96 forming the hotter zone for heating the scale 54 to a relatively higher temperature, namely from 200° to 300° F. and the plate 98 above it to a lesser degree by conduction and convection for holding the plastic sheets 62 which are heated in the apparatus shown to a temperature between 100° and 120° F.

As stated, our improved assembly apparatus is more particularly shown in Figs. 8 to 13. Said device includes a table mounted on a suitable surface, such as by the legs 102. In the embodiment shown the table includes a top 100, the base 101 mounted thereon and the plate 103 mounted on said base. A block 104 is rigidly mounted on the table having a substantially oblong hole 106 extending centrally therethrough designed to be substantially the length of the inset center portion 58 of said scale 54. Said block 104 has an upper wall tapering downwardly on each side of said oblong hole 106 as at 108. A forming die 110 is yieldably resiliently mounted on the table 100 to vertically reciprocate within said oblong hole 106, as shown more particularly in Fig. 11 by having a cylinder 112 projecting downwardly through a hole 105 in said table, having a piston 114 reciprocal within and supported in said cylinder by a spring 116, the upper end of said piston having the forming die 110 rigidly mounted thereon to reciprocate downwardly as said piston 114 sinks in said cylinder 112 against the pressure of the spring 116. The lower end of the piston may extend through the lower end of the cylinder 112 and be provided with suitable adjusting and lock nuts 118 and 120 for adjustably limiting the resistance of the spring 116. The forming die 110 is provided with an elongated transversely arched cavity or surface 78 therein for holding the similarly transversely arched inset center portion 58. Upper forming plates 80 rest on the downwardly tapering portions 108 of said block with the inner vertically extending ends 124 thereof extending a distance laterally within said hole 106 as shown in Fig. 12.

In our preferred embodiment, we provide guide plates 126 overlying said forming plates 80 rigidly secured to said frame with the inner ends 128 thereof terminating a distance further apart than the inner ends of said forming plates to provide an oblong guide slot 129 for the reception of the flat plastic covering sheet 62 therein. To retain the scale 54 in desired alignment over said plastic sheet we provide suitable guide means, such as the stanchions 130, suitably mounted on said table 100 at each end of said oblong hole 106, each having a guide slot 132 of the respective size of the bolster or tip of said scale therein, said guide means 130 extending a sufficient distance above said oblong plastic sheet receiving slot 129 to receive the tips or bolsters 60 of said scale within above said plastic sheet. We also provide a guideway 134 extending vertically above said forming die 110 having pins 138 projecting laterally thereof and the plunger 136 vertically reciprocatably mounted above said hole 106 on said guideway 134 having a cross head 140 mounted thereon adjacent the lower end of said guideway 134, said cross head having a pin 142 extending horizontally of each end thereof exterior of said guideway and a holding tool 144 of substantially the length of said inset scale cavity 58, less yieldably resiliently mounted on the lower end thereof. Said tool 144 may be resiliently mounted on the lower end of the plunger 136 in similar fashion as the forming die 110 is mounted on the table 100, namely, by providing a cylinder 146 depending downwardly from the lower end of the plunger having a piston 148 reciprocatably mounted therein with said forming tool 144 being mounted on the lower end of said piston, the upper end of said piston bearing resiliently against said cylinder against the pressure of the spring 150, the relative tension of which may be adjusted by means of the adjusting or lock nuts 152 and 154 at the opposite end of the cylinder 146 within the plunger 136.

We provide toggles 156 for obliquely reciprocating each respective forming plate 80 comprising an outer toggle link 158 connected to the outer respective edge of said block 104 and an inner toggle link 160 connected to each respective forming plate and an operating toggle link 162 having a vertical slot 164 therein for receiving said cross head pins 142. Spring means 168 are provided connecting the upper ends of said toggle operating links 164 to their respective guideway pins 138 and pivot means 166 are provided connecting the lower ends of said operating toggle links and the upper ends of said toggle links 158 and 160. Any suitable type of means, such as the electric resistance cartridges 170 may be provided to heat the block 104 to apply heat by conduction to the die 110 and the forming plates 80. Any suitable means may be provided to vertically reciprocate the plunger 136, such as the lever 172 pivotally mounted on said press as at 174 having a treadle (not shown) for operating the same and the opposite end 178 fitting in a suitable slot 180 in the plunger 136 to raise and lower the plunger.

It is thus obvious that our improved apparatus includes a forming block 104 having a slot 106 therein, forming means 80 movable over the surface of said block into said slot 106 and means for retaining the plastic sheet in position over said slot and forming means and an article to be wrapped over said plastic sheet comprising in the embodiment shown the guide stanchions 130, forming die 110 yieldably resiliently mounted to reciprocate within said slot, a plunger 136 vertically reciprocatably mounted above said slot to reciprocate within said slot, holding tool 144 less yieldably resiliently mounted on the lower end of said plunger adapted on the initial lowering of said plunger to force said article 54 and plastic sheet 62 within said hole 106 so that the edges thereof abut said forming means or plates 80 and means operable on further lowering of said plunger for obliquely reciprocating said respective forming means inwardly of said slot, said means operable on further lowering of said plunger comprising the cross head 140 which contacts the toggle operating links to operate the toggles to reciprocate the forming plates 80 obliquely inwards of said slot 106 and means comprising the springs 168 to resiliently return said last mentioned means to raised position on raising of said plunger 136.

In the actual operation of our device on the initial lowering of the plunger 136 said holding tool 144 abuts the scale 54 to force the plastic sheet 62 downwardly on said forming die to cause said forming die to yieldingly lower within said oblong hole 106 and said plastic sheet 62 to sink within the hole formed between the inner ends of said guide plates 126 permitting the edges 68 of said plastic sheet to abut the inner ends of said forming plates 80. It is then obvious that in this position of the plunger as shown in Fig. 15, the scale is only yieldably pressed against the plastic sheet, the pressure, however, being sufficient to bend the plastic sheet to the position shown in Fig. 15 whether it be heated to a semiplastic condition or not heated, sufficient heating taking place through conduction in the die to somewhat heat the plastic sheet. It is then obvious that on further lowering of the plunger 136 with the depression of the spring 150 said scale 54 and plastic sheet 62 may be relatively gently yieldably held in position between said yieldably mounted forming die 110 and yieldably mounted holding tool 144, said cross head pins 142 may abut the lower ends of said operating toggle link slots 164 to force said toggles 156 downwardly to reciprocate the forming plates 80 obliquely inwardly to cause the inner ends thereof to bend the upwardly extending edges 68 of said plastic sheet obliquely inwardly over the inset edges 59 of the inset center portions 58 of said scale and to compress the fold lines 70 of said plastic sheet 62 with sufficient pressure against said heated scale member to plasticize said fold lines 70 so that on cooling thereof they may become shrunk in drum tight condition over the surface of the inset center portion 58 of said scale. When the plunger is again raised it is obvious that the springs 168 will immediately return the toggles 156 and plates 80 to the position shown in Figs. 9 and 14. It is apparent, however, that our apparatus may be readily modified to completely cover the surface of the scale by omitting the guide stanchions 130 and providing oblong slots in the plates 80, or a plurality of plates may be provided to converge around the oblong hole in a manner similar to a camera shutter. Even if a flat scale holding member be employed the forming means or plates are preferably compressed at a slight oblique angle to not only bend the edges 68 of said plastic material over the edges 59 of said scale but to additionally press them against said edges to plasticize them. In the improved embodiment of the apparatus shown we preferably heat the device between 100° to 200° F., the plastic sheets being preferably preheated to 100° F. and the scale being preferably heated between 200° and 300° F. If desired, however, the press portions which contact the work may be heated sufficiently to render the plastic sheet plastic, and the means for preheating the plastic sheets and scale may be omitted.

It will thus be seen that we have provided a method and means by which the several objects of this invention are achieved and which is well adapted to meet the conditions of practical use.

As various possible embodiments might be made of the above invention, and as various changes might be made in the embodiments above set forth, it is to be understood that all matter set forth or shown in the accompanying drawings is to be interpreted as illustrative and not in a limiting sense.

Having thus described our invention, we claim as new and desire to secure by Letters Patent:

1. In an apparatus of the character described for manufacturing knife handles having a plastic scale covering member whose exposed surface is unbroken and which is self-held to an elongated scale, means for supporting said scale and scale covering members in relatively superimposed relationship, means for pressing together said scale and said scale covering members, means for folding said scale covering member over said scale, heating means, and means for pressing said heating means against said fold lines whereby to plasticize the same said last named means being so constructed and arranged that the pressure exerted between said heating means and said fold lines is greater than the pressure applied between said scale and scale covering members.

2. In an apparatus of the character described for manufacturing knife handles having a plastic scale covering member whose exposed surface is unbroken and which is self-held to an elongated scale, means for supporting said scale and scale covering members in relatively superimposed relationship, and reciprocably translatable means for folding said scale covering member over said scale, the folding surface of said means being spaced away from a longitudinal edge of said scale when in operative relationship thereto a distance less than the thickness of said plastic covering member.

3. In an apparatus of the character described for manufacturing knife handles having a plastic scale covering member whose exposed surface is unbroken and which is self-held to an elongated scale, means for supporting said scale and scale covering members in relatively superimposed relationship, reciprocably translatable means for folding said scale covering member over said scale, the folding surface of said means being spaced away from a longitudinal edge of said scale when in operative relationship thereto a distance less than the thickness of said plastic covering member, and means for heating said last named means.

4. Assembly apparatus comprising a forming block having a slot therein, forming means movable over the surface of said block into said slot, means for retaining a plastic wrapping sheet and an article to be wrapped in position over said slot and said forming means, a forming die yieldingly resiliently mounted to vertically reciprocate within said slot, a plunger vertically reciprocatably mounted above said slot to reciprocate within said slot, a holding tool less yieldably resiliently mounted on the lower end of said plunger adapted on initial lowering of said plunger to force said article and wrapping sheet within said slot so that the edges of said wrapping sheet abut said forming means, means operable on further lowering of said plunger for reciprocating said forming means inwardly of said slot and means to resiliently return said last mentioned means to raised position on raising of said plunger.

5. Assembly apparatus comprising a forming block having a slot therein, forming means movable over the surface of said block into said slot, means for retaining a plastic wrapping sheet and an article to be wrapped in position over said slot and said forming means, a forming die yieldingly resiliently mounted to vertically reciprocate within said slot, a plunger vertically reciprocatably mounted above said slot to reciprocate within said slot, a holding tool less yieldably resiliently mounted on the lower end of said plunger adapted on initial lowering of said plunger to force said article and wrapping sheet within said slot so that the edges of said wrapping sheet abut said forming means, means operable on further lowering of said plunger for obliquely reciprocating said forming means inwardly of said slot and means to resiliently return said last mentioned means to raised position on raising of said plunger.

6. Apparatus for use in the assembly of scale forming means for knife handles comprising a scale and a covering of plastic material of greater area than that of said scale having the edges thereof folded over the edges of said scale, comprising a table, a block rigidly mounted on said table having a hole extending centrally therethrough, a forming die having means thereon for holding the scale yieldingly resiliently mounted on said table to vertically reciprocate within said block hole, upper forming means resting on the upper surface of said block with the inner vertically extending end thereof normally extending a distance within said block hole, guide means overlying said forming means rigidly secured to said block with the inner end thereof terminating a distance further apart than the inner ends of said forming means to provide a guide slot for the reception of a flat plastic covering sheet therein, a guideway extending vertically above said forming die, a plunger vertically, reciprocatably mounted on said guideway above said table hole, a holding tool of substantially the length of said scale cavity less yieldably resiliently mounted on the lower end thereof, means operable on further lowering of said plunger for reciprocating each respective forming means inwardly of said block hole, means to resiliently return said last mentioned means to raised position on raising of said plunger and means to vertically reciprocate said plunger.

7. Apparatus for use in the assembly of scale forming means for knife handles comprising a scale and a covering of plastic material of greater area than that of said scale having the edges thereof folded over the edges of said scale, comprising a table, a block rigidly mounted on said table having a hole extending centrally therethrough and an upper wall tapering downwardly towards said hole, a forming die having means thereon for holding the scale yieldingly resiliently mounted on said table to vertically reciprocate within said block hole, upper forming means resting on the downwardly tapering portions of said block with the inner vertically extending end thereof normally extending a distance within said block hole, guide means overlying said forming means rigidly secured to said block with the inner end thereof terminating a distance further apart than the inner ends of said forming means to provide a guide slot for the reception of a flat plastic covering sheet therein, a guideway extending vertically above said forming die, a plunger vertically, reciprocatably mounted on said guideway above said table hole, a holding tool of substantially the length of said scale cavity less yieldably resiliently mounted on the lower end thereof, means operable on further lowering of said plunger for obliquely reciprocating each respective forming means inwardly of said block hole, means to resiliently return said last mentioned means to raised position on raising of said plunger and means to vertically reciprocate said plunger.

8. Assembly apparatus comprising a forming block having a slot therein, forming means movable into said slot, means for retaining a plastic wrapping sheet and an article to be wrapped in position over said slot and said forming means, means to move said wrapping sheet and said article together into said slot so that said wrapping sheet makes line contact with said forming means, and means for moving said forming means inwardly of said slot.

9. In a method of manufacturing a knife handle having an elongated arched scale with an elongated inset central portion with bolsters or tips at each end thereof and a plastic scale covering member of substantially the same length as said inset central portion, and whose surface is unbroken and which covering member is self-held to said scale, those steps comprising relatively superimposing said covering member on said inset central portion in such manner as to dispose a pair of opposed edges of said covering member immediately adjacent said tips or bolsters, plasticizing only portions adjacent edges of said covering member and displacing said plasticized portions relatively to the remainder of said covering member in such manner as to bring said displaced portion under said scale to anchor said scale covering member to said scale and to cause said remainder to allow shrinking of said covering member only transversely of said inset central portion.

10. In a method of manufacturing a knife handle having an elongated arched scale with an elongated inset central portion with bolsters or tips at each end thereof and a plastic scale covering member of substantially the same length as said inset central portion, and whose surface is unbroken and which covering member is self-held to said scale, those steps comprising relatively superimposing said covering member on said inset central portion in such manner as to dispose a pair of opposed edges of said covering member immediately adjacent said tips or bolsters, folding over portions adjacent edges of said scale covering member around the longitudinal edges of said inset central portion and plasticizing said scale covering member only at said folds, whereby said scale covering member retains its folded shape, is anchored to said scale, and shrinks only transversely of said inset central portion.

11. In a method of manufacturing a knife handle having an elongated arched scale with an elongated inset central portion with bolsters or tips at each end thereof and a plastic scale covering member of substantially the same length as said inset central portion, and whose surface is unbroken and which covering member is self-held to said scale, those steps comprising relatively superimposing said covering member on said inset central portion in such manner as to dispose a pair of opposed edges of said covering member immediately adjacent said tips or bolsters, bending portions adjacent edges of said scale covering member in such manner as to dispose said portions under said scale and plasticizing said scale covering member only at said bends, whereby said covering member retains its bent shape, is anchored to said scale and shrinks only transversely of said inset central portion.

12. In a method of manufacturing knife handles having a plastic scale covering member which is self-held to an elongated scale, those steps comprising pre-heating said scale covering member without plasticizing the same, relatively superimposing said scale covering member on said scale, plasticizing only portions adjacent the edges of said scale covering member and displacing said plasticized portions relatively to the unplasticized remainder of said covering member in such manner as to bring said displaced portions under said scale to anchor said scale covering member to said scale.

13. In a method of manufacturing knife handles having a plastic scale covering member which is self-held to an elongated scale, those steps comprising relatively superimposing said scale covering member on said scale, plasticizing only portions adjacent the edges of said scale covering member, stretching said scale covering member over the top of said scale, and displacing said plasticized portions relative to the unplasticized remainder of said covering member in such manner as to bring said displaced portions under said scale to anchor said scale covering member to said scale.

14. In a method of manufacturing knife handles having a plastic scale covering member which is self-held to an elongated scale, those steps comprising relatively superimposing said scale covering member on said scale, plasticizing only transversely spaced portions adjacent the edges of said scale covering member and displacing said plasticized portions relatively to the unplasticized remainder of said covering member in such manner as to bring said displaced portions under said scale whereby to anchor said scale covering member to said scale and whereby said unplasticized remainder allows shrinkage of said covering member only transversely of said scale.

15. In a method of manufacturing knife handles having a plastic scale covering member which is self-held to an elongated scale, those steps comprising relatively superimposing said scale covering member on said scale, plasticizing only portions adjacent the edges of said scale covering member and displacing said plasticized portions relatively to the unplasticized remainder of said covering member in such manner as to bring said displaced portions under said scale to anchor said scale covering member to said scale, said unplasticized remainder serving to prevent shrinking of said covering member except in said plasticized portions to thus control the tension in the portion of said scale covering member overlying the face of said scale.

16. In an apparatus for manufacturing knife handles including an elongated arched scale having an elongated central portion with bolsters or tips at either end thereof and a plastic scale covering member whose surface is unbroken and which is self-held to said scale, said covering member being of substantially the same length as said inset central portion, the combination of means for supporting said scale and said scale covering member in relatively superimposed relationship with a pair of opposed edges of said scale covering member immediately adjacent said tips or bolsters, means for plasticizing only portions adjacent edges of said covering member, and means for displacing said plasticized portions relatively to the unplasticized remainder of said covering member in such manner as to bring said displaced portions under said scale whereby to anchor said scale covering member to said scale and to cause said unplasticized remainder to allow shrinkage of said covering member only transversely of said inset central portion.

17. In an apparatus for manufacturing knife handles including an elongated arched scale having an elongated central portion with bolsters or tips at either end thereof and a plastic scale covering member whose surface is unbroken and which is self-held to said scale, said covering member being of substantially the same length as said inset central portion, the combination of means for supporting said scale and said scale covering member in relatively superimposed relationship with a pair of opposed edges of said scale covering member immediately adjacent said tips or bolsters, means for folding over portions adjacent edges of said scale covering member around the longitudinal edges of said inset central portion, and means for plasticizing said scale covering member only at said folds whereby said covering member retains its folded shape, is anchored to said scale, and shrinks only transversely of said inset central portion.

FELIX A. MIRANDO.
HENRY VOSSLER.